(12) United States Patent
Shimomura

(10) Patent No.: US 6,643,560 B2
(45) Date of Patent: Nov. 4, 2003

(54) DATA GENERATING DEVICE, DATA GENERATING METHOD AND DATA GENERATING PROGRAM

(75) Inventor: Katsunori Shimomura, Kawaguchi (JP)

(73) Assignee: INCS Inc., Kawasaki (JP)

( * ) Notice: Subject to any disclaimer, the term of this patent is extended or adjusted under 35 U.S.C. 154(b) by 0 days.

(21) Appl. No.: 10/261,535

(22) Filed: Sep. 30, 2002

(65) Prior Publication Data

US 2003/0033049 A1 Feb. 13, 2003

Related U.S. Application Data

(63) Continuation of application No. PCT/JP01/02574, filed on Mar. 28, 2001.

(30) Foreign Application Priority Data

Mar. 31, 2000 (JP) .................................. 2000-099519

(51) Int. Cl.[7] .............................................. B23K 26/00
(52) U.S. Cl. ................... 700/160; 700/159; 219/121.67
(58) Field of Search ................................ 700/159, 160, 700/173, 182; 219/121.67

(56) References Cited

U.S. PATENT DOCUMENTS

| | | | | |
|---|---|---|---|---|
| 5,285,394 A | * | 2/1994 | Montalcini et al. | 700/189 |
| 5,578,227 A | * | 11/1996 | Rabinovich | 219/121.63 |
| 5,584,016 A | * | 12/1996 | Varghese et al. | 700/97 |
| 6,128,546 A | * | 10/2000 | Basista et al. | 700/166 |

FOREIGN PATENT DOCUMENTS

| | | | | |
|---|---|---|---|---|
| JP | 4-190422 | 8/1992 | | |
| JP | 7-191722 | 7/1995 | | |
| JP | 07191722 A | * 7/1995 | ....... | G05B/19/4093 |
| JP | 09097108 A | * 4/1997 | ....... | G05B/19/4097 |
| JP | 11-73212 | 3/1999 | | |
| JP | 11338529 A | * 12/1999 | ....... | G05B/19/4097 |
| JP | 11-353013 | 12/1999 | | |
| JP | 11353013 A | * 12/1999 | ....... | G05B/19/4093 |

* cited by examiner

*Primary Examiner*—Leo Picard
*Assistant Examiner*—Michael D. Masinick
(74) *Attorney, Agent, or Firm*—Cohen & Pontani, Lieberman & Pavane

(57) ABSTRACT

The present invention relates to a data generating device, a data generating method and a data generating program for generating numerical data for controlling the operation of a cutting tool when machining an article. A data generating device 10 of the present invention comprises geometric data input means 26 to which a set of geometric data representing a shape of said article to be machined is input, partial geometric data generating means 28 for dividing the set of geometric data into a plurality of sets of partial geometric data each representing one of a plurality of article parts constituting said article to be machined, a plurality of partial numerical control data generating means 16,18,20,22,24 for generating from said sets of partial geometric data sets of partial numerical control data for machining article parts represented by the partial geometric data and numerical data unifying means 30 for generating a set of numerical control data for machining the whole of said article to be machined by unifying the plurality of sets of said partial numerical control data.

24 Claims, 18 Drawing Sheets

FIG. 11
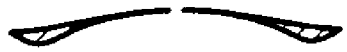

FIG. 12
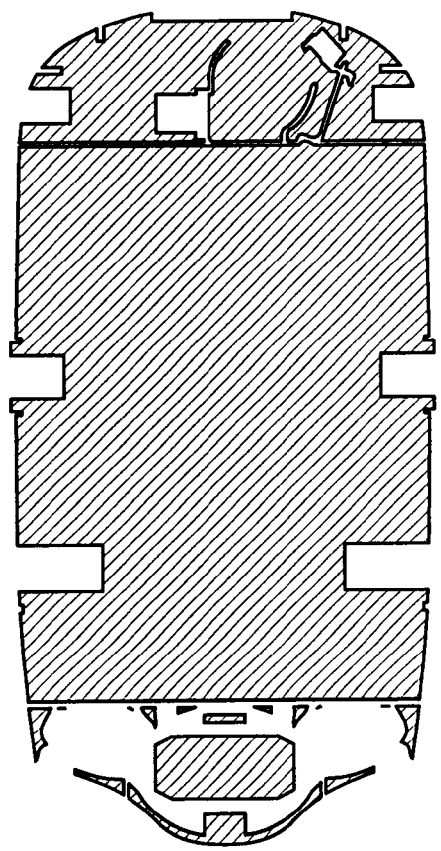
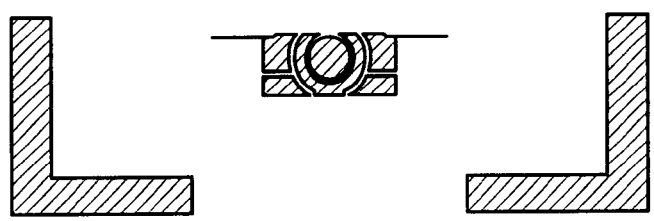

FIG. 13
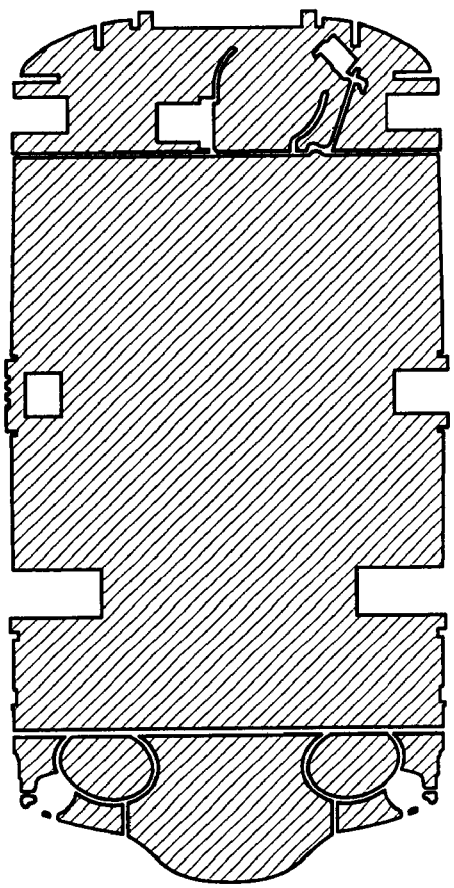
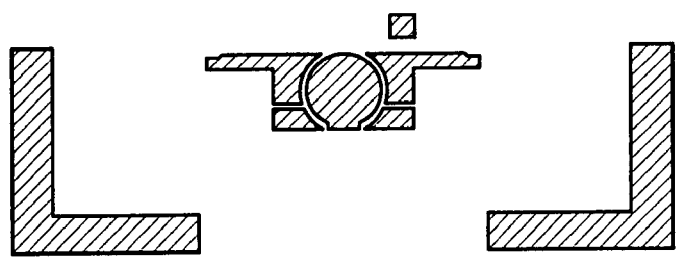

DATA GENERATING DEVICE, DATA GENERATING METHOD AND DATA GENERATING PROGRAM

This application is a U.S. Continuation Application under 35 USC 371 of International Application PCT/JP01/02574 filed Mar. 28, 2001.

BACKGROUND OF THE INVENTION

1. Field of the Invention

The present invention relates to a data generating device, a data generating method and a data generating program and, particularly, to a data generating device, a data generating method and a data generating program for generating numerical data for controlling the operation of a cutting tool that machines a workpiece.

2. Background

NC (Numerically Controlled) machines in which the operation of a cutting tool is controlled by numerical control (NC) data are generally used for machining articles such as molds for injection molding by cutting a workpiece. When such a machine is used, it is necessary to generate NC data for the NC machine, i.e., data for determining the NC path (path of the cutting tool) from geometric (shape) data of the article to be machined. Conventionally, such NC data have been generated using an interactive operation system in which a skilled operator generates NC data while visually confirming the shape of the article to be machined. That is, the skilled operator generates NC data choosing the NC path considered to be most suitable for the shape of the article to be machined.

Since the shapes of articles to be machined have become complex due to diversification of consumer demands and progress in cutting technology, generation of NC data has come to require highly advanced techniques. The practice has therefore become to generate the NC data by automatic calculation using a large scale computer and to conduct the cutting of the workpiece by operating a high speed NC machine based on the thus-generated NC data.

However, since the shape of articles to be machined has become complex, the amount of NC data that needs to be generated has become huge, and, therefore, the time required for generating NC data has become longer than the time needed for the machining operation in the NC machine. In the series of processes from the generation of the NC data through the machining operation, therefore, it frequently happens that even though the high-speed NC machine has finished the cutting operation of one article, it cannot start the cutting operation for the next article because generation of the NC data for next article to be machined has not yet been completed. Thus the NC machine stands idle for some period of time and the operating efficiency is degraded.

With the life-cycle of commodities now shorter than ever before, there is a pressing need to reduce the period between the development and marketing of new commodities. This makes it necessary to promptly machine the injection molds and other articles needed to produce a new product. Owing to the fact that generation of the NC data is time consuming, however, machining of an injection mold often cannot be promptly started even though the design of the mold has been completed. Marketing of the new product is therefore delayed.

One object of the present invention is to overcome the foregoing problems by providing a data generating device, a data generating method and a data generating program that can generate numerical data for controlling the operation of a cutting tool in short time.

SUMMARY OF THE INVENTION

The present invention provides a data generating device for generating numerical control data for controlling the operation of a cutting tool when machining an article. The data generating device comprises geometric data input means to which a set of geometric data representing a shape of said article to be machined is input, partial geometric data generating means for dividing the set of geometric data into a plurality of sets of partial geometric data each representing one of a plurality of article parts constituting said article to be machined, a plurality of partial numerical control data generating means for generating from said sets of partial geometric data sets of partial numerical control data for machining article parts represented by the partial geometric data, and numerical data unifying means for generating a set of numerical control data for machining the whole of said article to be machined by unifying the plurality of sets of said partial numerical control data.

The so-configured data generating device can promptly generate the numerical control data because the generation of the numerical control data is decentralized and conducted separately for each part of the article to be machined.

In a preferred embodiment of the present invention, said plurality of partial numerical control data generating means generate at least two sets of partial numerical control data in parallel. The so-configured data generating device can promptly generate the numerical control data because the generation of the numerical control data is conducted in parallel.

In a preferred embodiment of the present invention, each of said article parts is formed as a layer extending in a direction perpendicular to a cutting depth direction of said cutting tool.

Due to such configuration, the cutting tool for machining article parts needs only to be moved in a direction perpendicular to the cutting depth direction in each layer and, therefore, the numerical data for machining each article part may be made uniform.

In another preferred embodiment of the present invention, all of said layers have the same thickness. According to this configuration, the control of the device can be simplified.

In another preferred embodiment of the present invention, the thickness of said layer is integer times said cutting depth of the cutting tool. According to this configuration, efficient and precise cutting can be achieved.

In another preferred embodiment of the present invention, the thickness of the layer is varied depending on the amount of the data for said layer. According to this configuration, the load of the calculation for generating the partial geometric data can be varied depending on the amount of data to be calculated.

In another preferred embodiment of the present invention, the thickness of a layer having a larger amount of said partial geometric data is set thinner than thickness of a layer having a smaller amount of said partial geometric data. According to this configuration, the load of the calculation in generation of the partial geometric data can be made uniform among the article parts.

In another preferred embodiment of the present invention, said partial numerical control data generating means comprises a plurality of computers.

In another preferred embodiment of the present invention, some of said computers are connected via network. According to this configuration, data are promptly sent and received.

Another preferred embodiment of the present invention further comprises NC data checking means for simulating the operation of said cutting tool based on the numerical control data generated by said numerical data unifying means.

Another preferred embodiment of the present further comprises data fractionating means for fractionating said sets of partial geometric data into smaller sets of geometric data representing smaller parts that can be machined in one cutting operation by said cutting tool.

In another preferred embodiment of the present, said set of geometric data is solid data.

In another aspect, the present invention provides a data generating method for generating numerical control data for controlling the operation of a cutting tool when machining an article to be machined. The data generating method comprises steps of inputting a set of geometric data representing a shape of said article to be machined, dividing said set of geometric data to generate a plurality of sets of partial geometric data each representing one of a plurality of article parts constituting said article to be machined, generating from said sets of partial geometric data sets of partial numerical control data for machining article parts represented by the partial geometric data, and unifying the plurality of sets of said partial numerical control data to generate a set of numerical control data for machining the whole of said article to be machined.

In another preferred embodiment of the present, said step of generating sets of partial numerical control data includes a step of generating at least two sets of partial numerical control data in parallel.

In another preferred embodiment of the present, said article part is set smaller in a portion where the amount of said partial geometric is large than in a portion where the amount of said partial geometric data is small.

In another preferred embodiment of the present, the method further comprises a step of NC data checking for simulating the operation of said cutting tool based on the numerical control data generated by said numerical data unifying means.

In another preferred embodiment of the present, the method further comprises a step of fractionating for fractionating said sets of partial geometric data into smaller sets of geometric data representing smaller parts that can be machined in one cutting operation by said cutting tool.

In another aspect, the present invention provides a data generating program representing instructions executable by a computer. The program comprises instructions for inputting a set of geometric data representing a shape of an article to be machined, instructions for dividing said set of geometric data to generate a plurality of sets of partial geometric data each representing one of a plurality of article parts constituting said article to be machined, instructions for generating from said sets of partial geometric data sets of partial numerical control data for machining article parts represented by the partial geometric data, and instructions for unifying the plurality of sets of said partial numerical control data to generate a set of numerical control data for machining the whole of said article to be machined.

In another preferred embodiment of the present invention, in said instructions for generating partial numerical control data, said article part is set smaller in a portion where the amount of said partial geometric data is large than in a portion where the amount of said partial geometric data is small.

BRIEF DESCRIPTION OF THE DRAWINGS

FIG. 11 is a cross-sectional view taken along line B—B in FIG. 10.

FIG. 12 is a cross-sectional view taken along line C—C in FIG. 10.

FIG. 13 is a cross-sectional view taken along line D—D in FIG. 10.

DETAILED DESCRIPTION OF THE PREFERRED EMBODIMENTS

Figure 1:
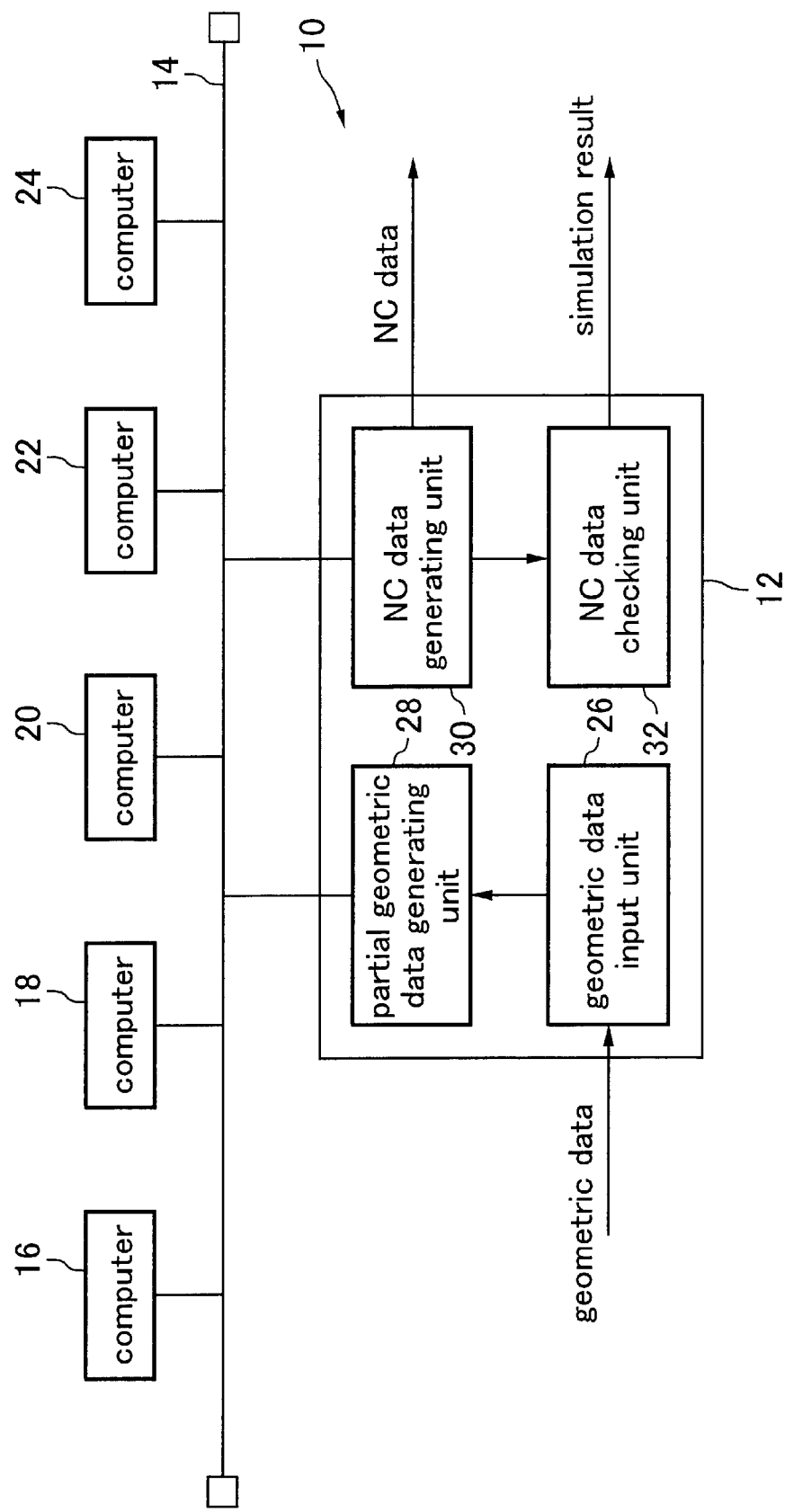
FIG. 1 is a schematic diagram showing a data generating device that is a first embodiment of the present invention.

A data generating device 10 that is a first embodiment of the present invention will be explained with reference to FIGS. 1–4. FIG. 1 is a diagram showing the data generating device 10.

The data generating device 10 of the present embodiment is a data generating device for generating NC (Numerical Control) data for controlling the operation of cutting tool to machine an article to. As shown in FIG. 1, the data generating device 10 comprises a data generating unit 12 and a plurality of computers, five computers 16, 18, 20, 22 and 24 in the illustrated example, that are connected to the data generating unit 12 via a network 14. The data generating unit 12 and each computer 16, 18, 20, 22, 24 is constituted as, for example, a workstation, a personal computer or the like. As the network 14, there can be utilized a suitable communication network, such as a local area network or the Internet.

The data generating unit 12 includes a geometric data input unit 26 (geometric data input means), a partial geometric data generating unit 28 (partial geometric data generating means), an NC data generating unit 30 (partial numerical control data generating means and numerical data unifying means), and an NC data checking unit 32.

The geometric data input unit 26 is adapted to receive a set of geometric data representing the shape of the article to be machined. Specifically, a set of geometric data of the article generated by a CAD (Computer Aided Design) system or the like is input to the geometric data input unit 26 using a recording medium such as flexible disc or via suitable means such as the network 14. As the geometric data, there are used, for example, solid data directly defining the three-dimensional shape of the article to be machined. The geometric data input unit 26 is adapted to modify the input data and to select a cutting tool suitable for machining the article represented by the geometric data. The geometric data input unit 26 is also adapted to output information regarding the selected tool (depth of cutting and diameter of cutting tool) and the set of geometric data to the partial geometric data generating unit 28.

Figure 2:
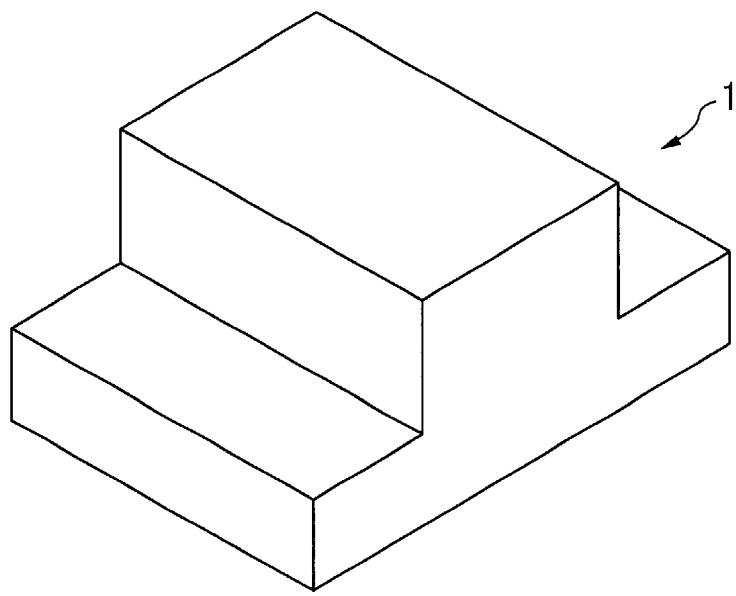
FIG. 2 is a perspective view showing an article to be machined whose data is generated by the data generating device according to the first embodiment of the present invention.
Figure 3:
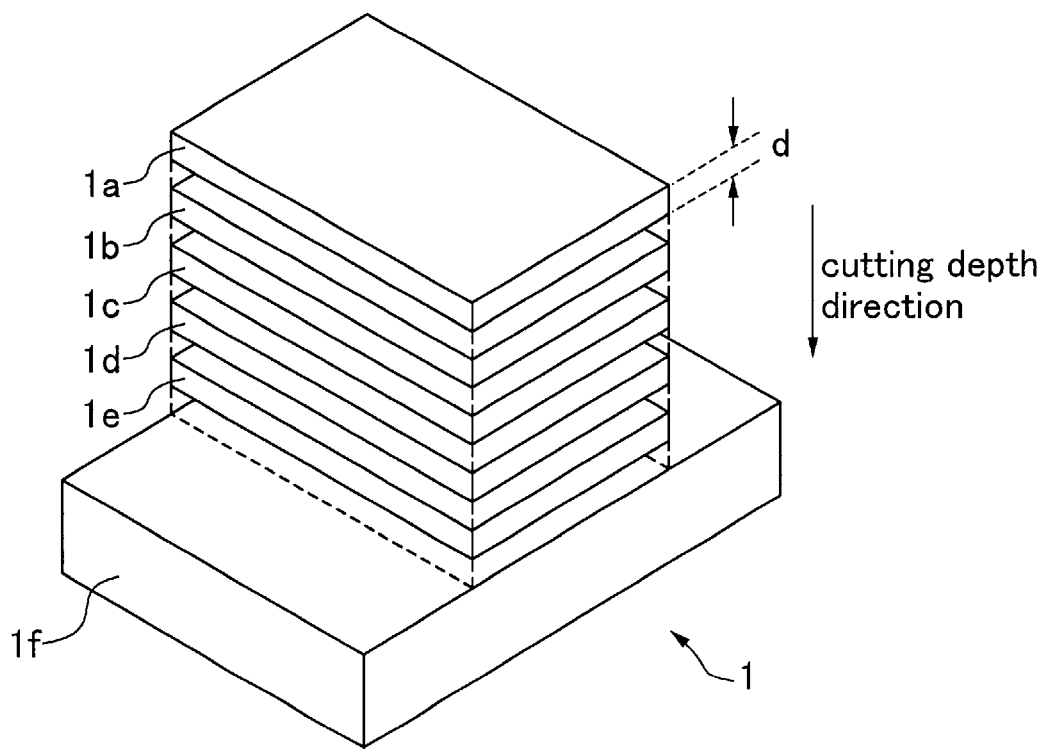
FIG. 3 is an exploded perspective view showing the article of FIG. 2 divided into a plurality of machined article parts.

The partial geometric data generating unit 28 is adapted to generate a plurality of sets of partial geometric data representing a plurality of divided parts constituting the article to be machined. The partial geometric data generating unit 28 is adapted to respond to input of a set of geometric data of an article to be machined 1 such as shown in FIG. 2 by generating a plurality of sets of partial geometric data representing five parts 1a–1e formed as layers along a cutting depth direction by dividing the geometric data of the article 1 as shown in FIG. 3. (Since the part if shown in FIG. 3 will not be machined, no partial data representing this part is generated.)

In the present embodiment, the thickness of each part 1a–1e formed as a divided layer is the same as the cutting depth d of the cutting tool selected by the geometric data input unit 26. The cutting depth d means the cutting depth in one cutting operation by the cutting tool. To be exact, the cutting depth direction of the cutting tool is determined when the work is cut to machine an article. However, the set of geometric data of an article to be machined generally includes a predetermined reference plane (a plane contacting the stage of the machining center) and the reference plane and the cutting depth direction have a specific relation (in many cases, they are perpendicular to each other). Therefore, the cutting depth direction of the cutting tool with respect to the article to be machined is determined when the set of geometric data of the article to be machined is generated.

The partial geometric data generating unit 28 is adapted to send the partial geometric data representing the five parts 1a–1e to the five computers 16, 18, 20, 22, 24 via the network 14 together with information regarding the cutting tool selected by the geometric data generating unit 26. More specifically, the partial geometric data generating unit 28 is adapted to output the set of partial geometric data representing part 1a and information regarding the cutting tool to the computer 16, to output the set of partial geometric data representing part 1b and information regarding the cutting tool to the computer 18, to output the set of partial geometric data representing part 1c and information regarding the cutting tool to the computer 20, to output the set of partial geometric data representing part 1d and information regarding the cutting tool to the computer 22 and, to output the set of partial geometric data representing part 1e and information regarding the cutting tool to the computer 24.

Each of the computers 16, 18, 20, 22, 24 is adapted to generate a set of NC data for controlling the cutting tool so as to machine the corresponding one of the five parts 1a–1e based on corresponding one of the five sets of partial data generated by the partial geometric data generating unit 28. This set of NC data includes data such as data for the path of the cutting tool, translation speed of the cutting tool and rotation speed of the cutting tool. Each of the computers 16, 18, 20, 22, 24 is adapted to send the set of partial generated NC data to the NC data generating unit 30.

Each of the computers 16, 18, 20, 22, 24 generates the set of partial NC data from the received set of partial geometric data independently of and in parallel with the other computers, in a known manner.

The NC data generating unit 30 is adapted to unify the sets of NC data for controlling the cutting machine so as to machine the five parts 1a–1e that were generated in the computers 16, 18, 20, 22, 24 and thus generate a set of NC data for controlling the operation of the cutting tool to machine the whole of article 1. Specifically, the NC generating unit 30 generates a set of NC data for machining the whole of article 1 by arranging the sets of data for machining the five parts 1a–1e in order. In this arranging process, NC data for moving the cutting tool in the cutting depth direction by one step (that is by cutting depth d) are inserted between the set of NC data for machining the part 1a and the set of NC data for machining the part 1b, between the set of NC data for machining the part 1b and the set of NC data for machining the part 1c, between the set of NC data for machining part the 1c and the set of NC data for machining the part 1d, and between the set of NC data for machining the part 1d and the set of NC data for machining the part 1e. The NC data generating unit 30 is adapted to output the thus-generated NC data to the set of NC data checking unit 32.

The NC data checking unit 32 is adapted to simulate an operation of the cutting tool using the set of NC data generated by the NC data generating unit 30 and to show the result of the simulation on a display (not shown). By referring to the simulation result, therefore, the user of the data generating device 12 can ascertain the shape of the article to be machined, the machining time and whether a dangerous operation of the cutting tool will occur. The user can modify the NC data if the simulated article does not have the desired shape, the machining time is extremely long and/or the cutting tool is apt to operate dangerously.

The NC data generating unit 30 is adapted to output the generated set of NC data in response to an instruction from the user upon accepting the simulation result, or automatically if the result of the simulation performed by the NC data checking unit 32 satisfies predetermined conditions. Such output of the set of NC data may be performed by creating an NC data file or by sending the data directly to the NC machine.

Figure 4:
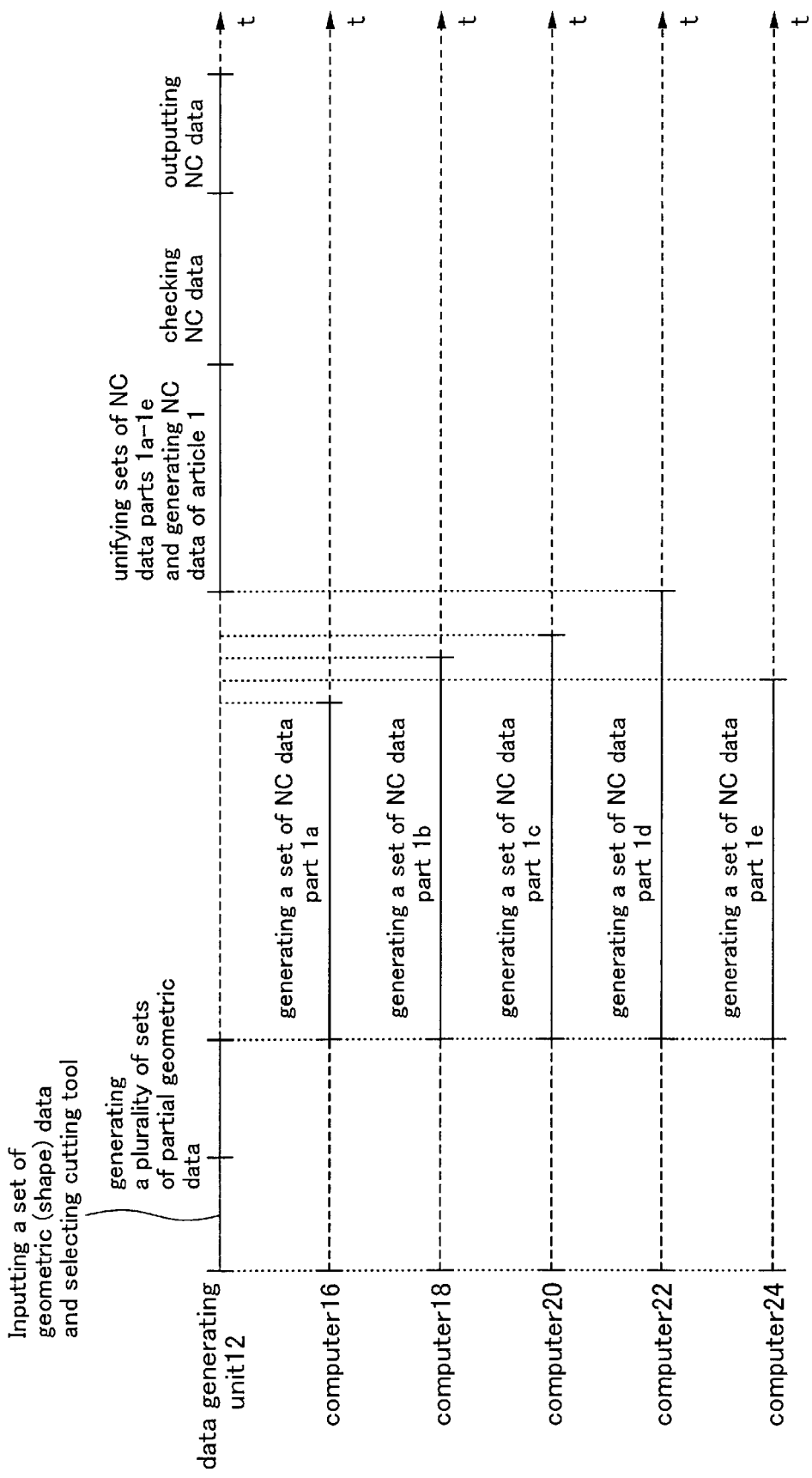
FIG. 4 is a time chart for showing one example of the operation of the data generating device of the first embodiment of the present invention.

The operation of the data generating device 10 of the present embodiment will now be explained with reference to an example in which the data generating device 1 generates NC data for machining the article 1. FIG. 4 is a timing chart showing operation timing of the constituent elements of the data generating device 10 of the present embodiment (the data generating unit 12 and computers 16, 18, 20, 22, 24). In FIG. 4, the period when an element executes a process such as calculation is represented by a solid line and period when element does not execute a process such as calculation is represented by a dotted line.

First, a set of geometric (shape) data with respect to the article to be machined is input to the geometric data input unit 26 in the data generating device 12. Specifically, geometric data of the article generated by a CAD system or the like is input to the geometric data input unit 26 using a recording medium such as flexible disc or the network 14. As geometric data is used, for example, solid data that directly define the three-dimensional shape of the article to be machined. Once the geometric data of the article are input to the geometric data input unit 26, the geometric data input unit 26 modifies the input set of geometric data and selects the cutting tool suitable for machining the article represented by the input set of geometric data. Information with respect to the selected tool (depth of cut and diameter of cutting tool) and the set of geometric data are output to the partial geometric data generating unit 28.

Once the information regarding the selected tool and the set of geometric data are output to the partial geometric data generating unit 28, the partial geometric data generating unit 28 generates a plurality of sets of partial geometric data representing a plurality of parts constituting the article to be machined respectively based on the set of data input through the geometric data input unit 26. More specifically, in case geometric data representing the article 1 shown in FIG. 2, for example, five sets of partial geometric data representing the five parts 1a–1e formed as layers along the cutting depth direction are generated by dividing the set of geometric data of the article 1 as shown in FIG. 3. (Since a part if shown in FIG. 3 will not be machined, no set of partial geometric data representing this part is generated.) In the present embodiment, the thickness of each of the parts 1a–1e formed in layers is same as the cutting depth d of the cutting tool selected by the geometric data input unit 26. The sets of the partial geometric data representing the five parts 1a–1e generated by the geometric data input unit 26 are sent to the corresponding ones of the five computers 16, 18, 20, 22, 24 via the network 14 together with information regarding the cutting tool selected by the geometric data generating unit 26.

More specifically, the set of partial geometric data representing the part 1a and the information regarding the cutting tool are output to the computer 16, the set of partial geometric data representing the part 1b and the information regarding the cutting tool are output to the computer 18, the set of partial geometric data representing the part 1c and the information regarding the cutting tool are output to the computer 20, the set of partial geometric data representing the part 1d and the information regarding the cutting tool are output to the computer 22 and the set of partial geometric data representing the part 1e and the information regarding the cutting tool are output to the computer 24. The computers 16, 18, 20, 22, 24 do not execute any process such as calculation at the time the input of the geometric data, selection of the cutting tool and generation of partial geometric data are executed in the data generating device 12.

Once the partial geometric data and information on the selected tool are sent from the partial geometric data generating unit 28 in the data generating device 12 to the five computers 16, 18, 20, 22, 24, the five computers 16, 18, 20, 22, 24 generate sets of NC data for controlling the cutting tool so as to machine the five parts 1a–1e. These sets of NC data include data for the path of the cutting tool, the translation speed of the cutting tool and the rotation speed of the cutting tool. The thus-generated sets of NC data are sent from the computers 16, 18, 20, 22, 24 to the NC data generating unit 30 in the data generating device 12.

More specifically, the set of NC data for machining the part 1a is generated in the computer 16 based on the set of partial geometric data for the part 1a and the information on the cutting tool sent from the partial geometric data generating unit 28 in the data generating device 12. The thus-generated set of NC data (data for machining the part 1a) is sent to the NC data generating unit 30 in the data generating device 12.

Further, the set of NC data for machining the part 1b is generated in the computer 18 based on the set of partial geometric data for the part 1b and the information on the cutting tool sent from the partial geometric data generating unit 28 in the data generating device 12. The thus-generated set of NC data (data for machining the part 1b) is sent to the NC data generating unit 30 in the data generating device 12.

Further, the set of NC data for machining the part 1c is generated in the computer 20 based on the set of partial geometric data for the part 1c and the information on the cutting tool sent from the partial geometric data generating unit 28 in the data generating device 12. The thus-generated set of NC data (data for machining the part 1c) is sent to the NC data generating unit 30 in the data generating device 12.

Further, the set of NC data for machining the part 1d is generated in the computer 22 based on the set of partial geometric data for the part 1d and the information on the cutting tool sent from the partial geometric data generating unit 28 in the data generating device 12. The thus-generated set of NC data (data for machining the part 1d) is sent to the NC data generating unit 30 in the data generating device 12.

Further, the set of NC data for machining the part 1e is generated in the computer 24 based on the set of partial geometric data for the part 1e and the information on the cutting tool sent from the partial geometric data generating unit 28 in the data generating device 12. The thus-generated set of NC data (data for machining the part 1e) is sent to the NC data generating unit 30 in the data generating device 12.

The data generating process in each of the computers 16, 18, 20, 22, 24 is performed independently from that in the other computers. That is, the computers 16, 18, 20, 22, 24 conduct parallel processing. The processing for generating the NC data from the partial geometric data is executed by the computers 16, 18, 20, 22, 24 in a known manner.

The data generating device 12 does not execute any process such as calculation while the computers 16, 18, 20, 22, 24 are generating the NC data.

Once the sets of the NC data sent from the computers 16, 18, 20, 22, 24 are received by the NC data generating unit 30 in the data generating device 12, the NC data generating unit 30 unifies the five sets of NC data for controlling the operation of the cutting tool so as to machine the five parts 1a–1e and generates a set of NC data for machining the article 1 as a whole.

The processing for generating the NC data for the whole of the article 1 conducted by the NC data generating unit 30 begins when all sets of the NC data for the five parts 1a–1e forming the article 1 have been received (in the example shown in FIG. 4, upon receiving the NC data for the part 1d).

The set of NC data for the whole of the article 1 is generated by unifying in order the sets of the NC data for controlling the cutting machine so as to machine the five parts 1a–1e that were generated in the computers 16, 18, 20, 22, 24. In this process, NC data for moving the cutting tool in the cutting depth direction by one step (that is by cutting depth d) are inserted between the set of NC data for machining the part 1a and the set of NC data for machining the part 1b, between the set of NC data for machining the part 1*b* and the set of NC data for machining the part 1*c*, between the set of NC data for machining part the 1*c* and the set of NC data for machining the part 1*d*, and between the set of NC data for machining the part 1*d* and the set of NC data for machining the part 1*e*. The thus-generated set of NC data is output to the NC data checking unit 32.

The NC data checking unit 32 simulates the operation of the cutting tool using the set of NC data generated by the NC data generating unit 30 and shows the result of the simulation on a display (not shown). By referring to the result of the simulation, therefore, the user of the data generating device 12 can ascertain the shape of the article to be machined, the machining time and whether a dangerous operation of the cutting tool will occur. The user can modify the NC data if he finds that the simulated article does not have the desired shape, the machining time is extremely long and/or the cutting tool is apt to operate dangerously.

After the simulation by the NC data checking unit 32, the set of NC data is output in response to an instruction from the user of the data generating device 12 upon accepting the simulation the simulation result, or automatically if the result of the simulation performed by the NC data checking unit 32 satisfies predetermined conditions. Such output of the set of NC data may be executed by creating an NC data file or by sending the data directly to the NC machine. The computers 16, 18, 20, 22, 24 do not execute any process such as calculation at the time the data generating device 12 executes the process for unification of the sets of data, generation of data, checking of the data and output of the data.

According to so-configured data generating device, it is possible to generate in parallel (simultaneously) plural sets of NC data for machining the five parts 1*a*–1*e* by using the five computers 16, 18, 20, 22, 24. As a result, the set of NC data for controlling the operation of the cutting tool to machine the article 1 can be generated in a short time.

Further, in the data generating device 10 of the present embodiment, the five parts 1*a*–1*e* are formed by dividing the article 1 into layers along the cutting direction of the cutting tool. Accordingly, since the cutting tool is moved in a plane perpendicular to the cutting direction, the set of NC data for machining the five parts 1*a*–1*e* can be simplified. As a result, the set of NC data for controlling the operation of the cutting tool to machine the article 1 can be generated in a short time.

Further, in the data generating device 10 of the present embodiment, since the thickness of each of the five parts 1*a*–1*e* is equal to the cutting depth of the cutting tool, a set of NC data enabling an efficient cutting operation can be generated. As a result, the machining time for the article 1 is reduced.

Figure 5:
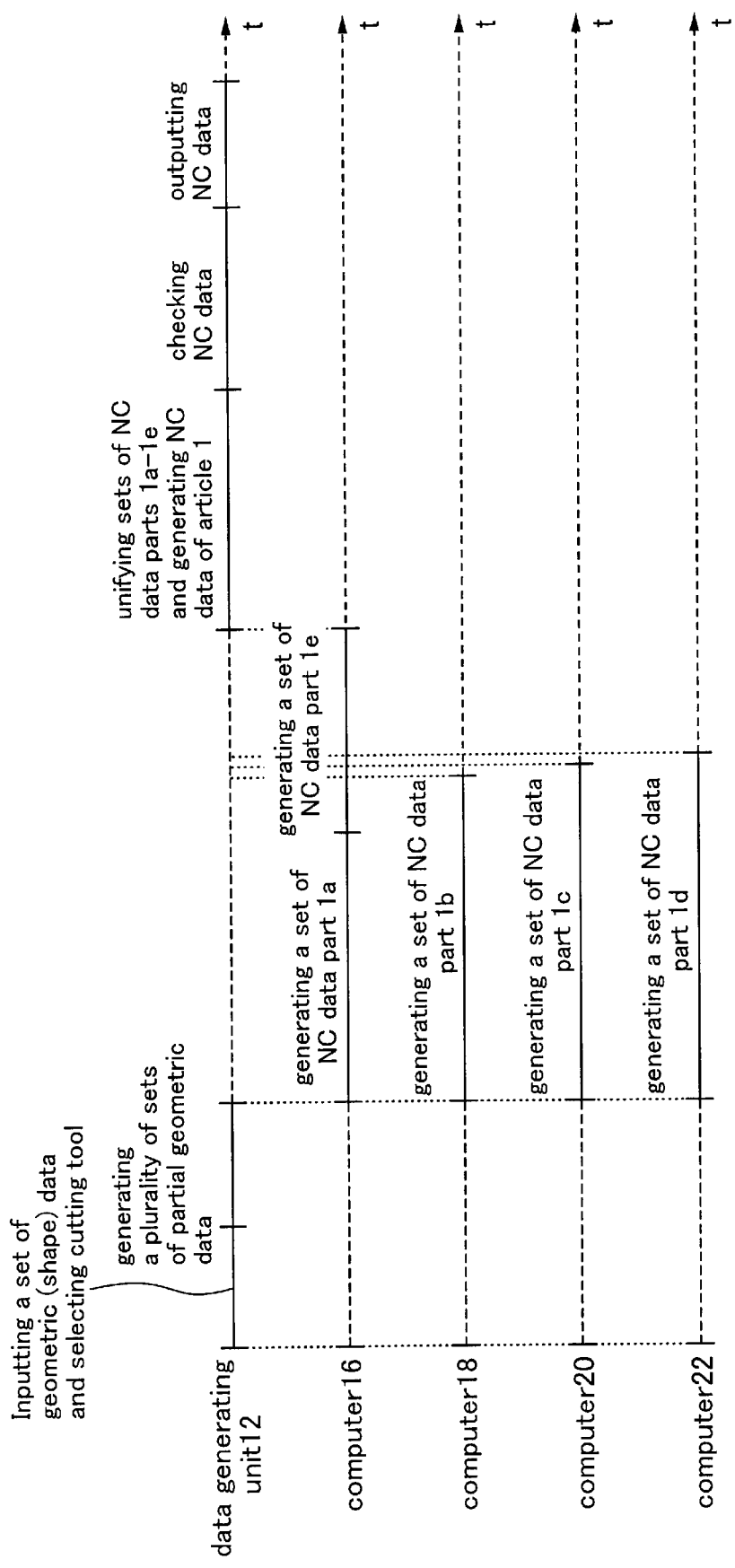
FIG. 5 is a time chart for showing an example of the operation of a data generating device that is an alternative of the first embodiment of the present invention.

Although, in the above embodiment, the set of geometric data representing the article 1 is divided into sets of partial geometric data for the five parts 1*a*–1*e* and sets of partial geometric data for the respective five parts 1*a*–1*e* are separately generated in the five computers 16, 18, 20, 22, 24, the number of computers need not necessarily match the number of divided partial geometric data. That is, the geometric data representing the article 1 can be divided into sets of partial geometric data for five parts 1*a*–1*e* and the sets of partial geometric data for the five parts 1*a*–1*e* can be generated in the four computers 16, 18, 20, 22. In this case, as shown in FIG. 5, one of computers (computer 16 in FIG. 5) generates the sets of NC data for two parts (parts 1*a* and 1*e* in FIG. 5), for example.

Although the above description does not touch on the matter of changing the cutting tool, the operation for machining the article 1 often includes a rough cutting process using a cutting tool of larger cutting depth and a fine cutting process using a cutting tool of smaller cutting depth. In this case, sets of partial geometric data can be generated with respect to each of the rough cutting process and the fine cutting process and sets of NC data for the machining each of the parts be generated. The NC data generating unit 30 can then unify the sets of NC data for machining the plurality of parts in the rough cutting process and the NC data for machining the plurality of parts in the fine cutting process to generate the NC data for the whole of the article 1.

Figure 6:
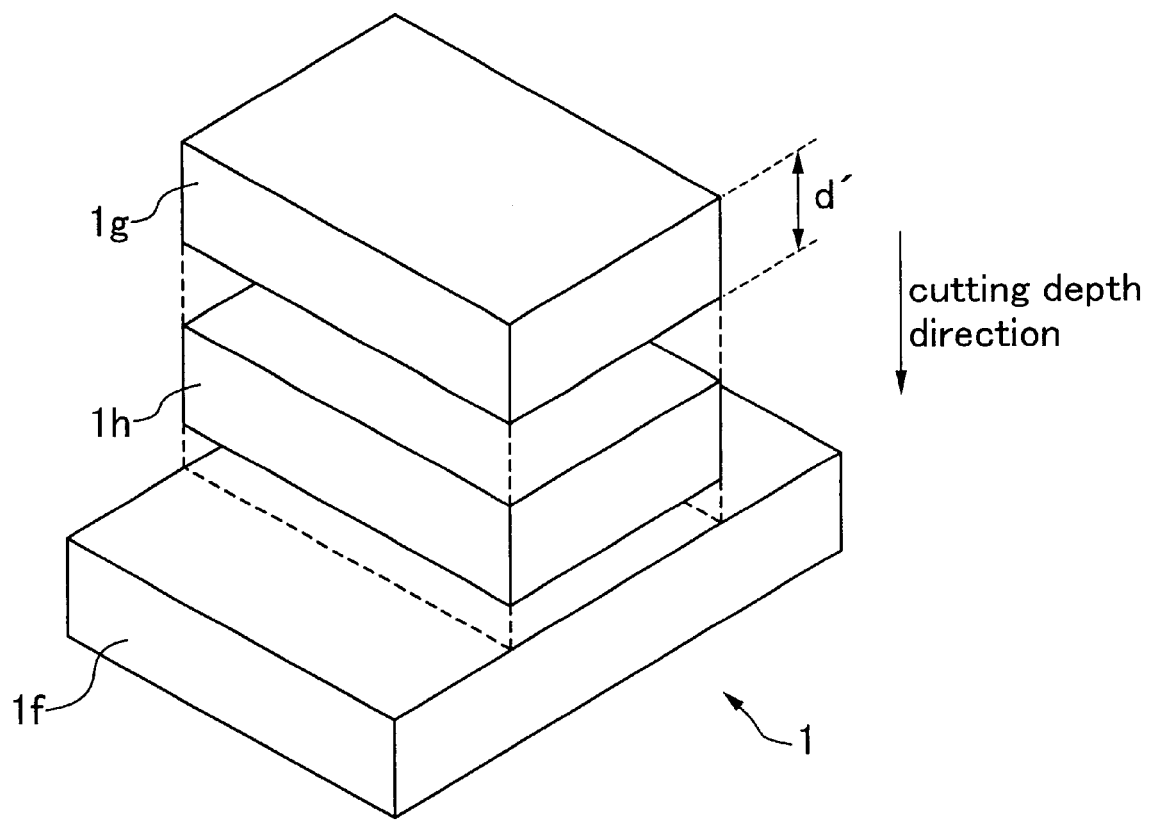
FIG. 6 an exploded perspective view showing an article to be machined divided into a plurality of machined article parts.
Figure 7:
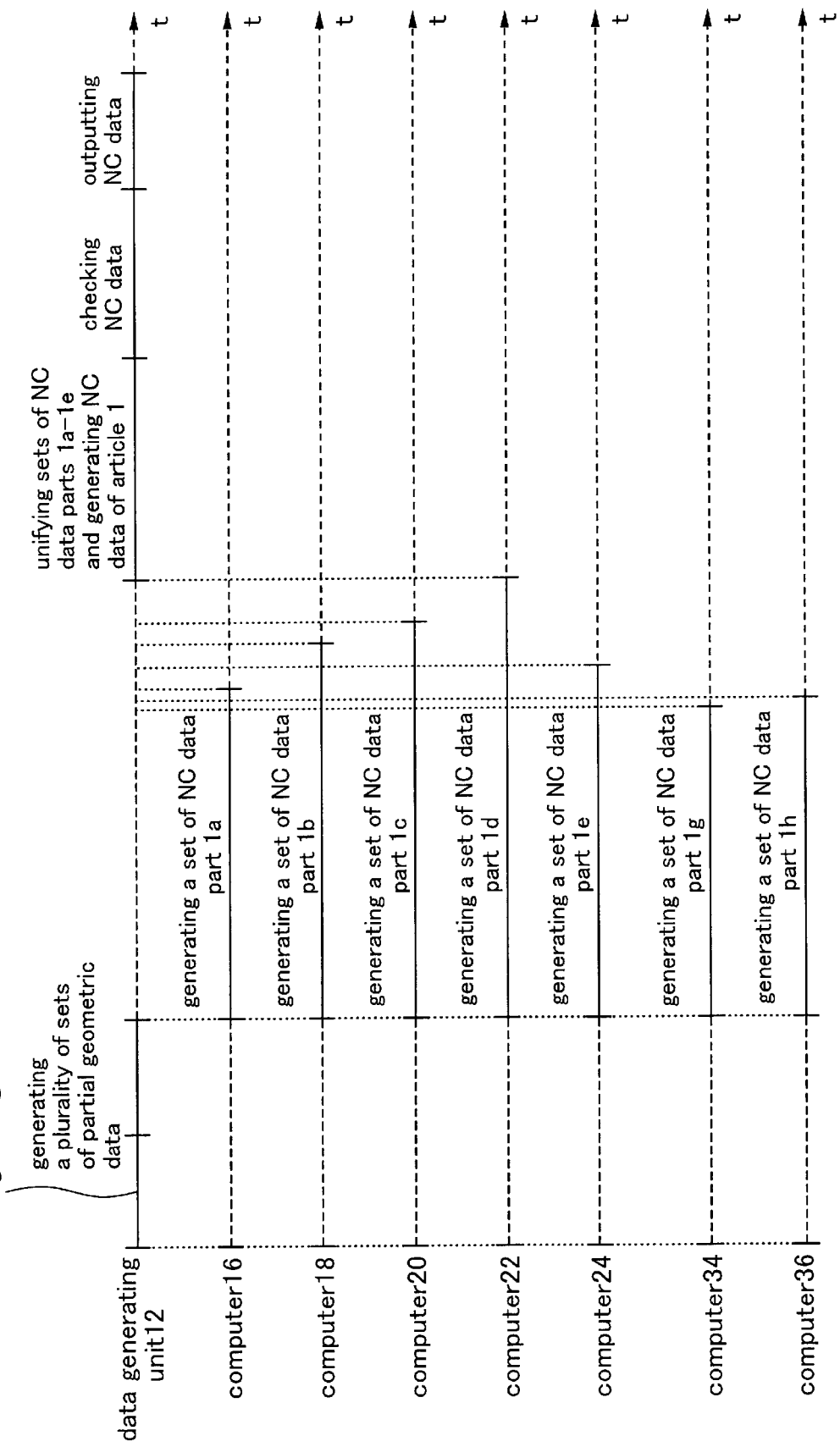
FIG. 7 is a time chart for showing an example of the operation of a data generating device that is another alternative of the first embodiment of the present invention.

That is, in order to generate the set of NC data for the rough cutting process, the set of geometric data representing the article 1 shown in FIG. 2 is divided into two parts 1*g* and 1*h* as shown in FIG. 6. In order to generate sets of NC data for the fine cutting process, the geometric data representing the article 1 shown in FIG. 2 is divided into five parts 1*a*–1*e* as shown in FIG. 3. The two parts 1*f* and 1*g* are layers made by dividing the article 1 into two parts in the cutting depth direction and the thickness thereof is equal to the cutting depth d' of the cutting tool used in the rough cutting operation. In this example, the set of NC data for machining the article 1 to be machined is generated as shown in the time chart of FIG. 7. In this case, computers 34, 36 for generating the sets of NC data for machining the two parts 1*g* and 1*h* in the rough cutting process are added. This principle can be applied not only to rough and fine cutting processes but also to a cutting process for cutting any uncut portions that remain.

In the data generating device 10 of the above embodiment, the thickness of the parts 1*a*–1*e* is same as the cutting depth d of the cutting tool. Alternatively, however, the thickness of the layers may set twice or three times the cutting depth of the cutting tool.

In the data generating device 10 of the above embodiment, the data generating unit 30 of the data generating device 12 is adapted to start to generate the set of NC data for whole of the article 1 when all sets of the NC data of the plurality of the parts constituting the article 1 are input. However, in the present invention, the data generating unit 30 of the data generating device 12 may start to unify the sets of the NC data already sent from the computers and generate the NC data for machining the article 1 to be machined before all sets of the NC data representing the parts constituting article 1 are input. This case will be specifically explained with reference to FIG. 4. When the NC data generating unit 30 receives the sets of NC data for machining parts 1*a* and 1*b*, the NC data generating unit 30 in the data generating device 12 may start to generate the set of the NC data for machining the article 1 by unifying the sets of the NC data already sent before receiving the sets of NC data for machining the parts 1*c* and 1*d*.

A data generating device 210 that is a second embodiment of the present invention will now be described with reference to FIGS. 8 through 19. The data generating device 210 generates NC data (Numerically Controlled data) for controlling the operation of a cutting tool such as an end mill during machining in an NC machine (machining center). The basic configuration of the data generating device 210 is the same as that of the data generating device 10 of the first embodiment.

Figure 8:
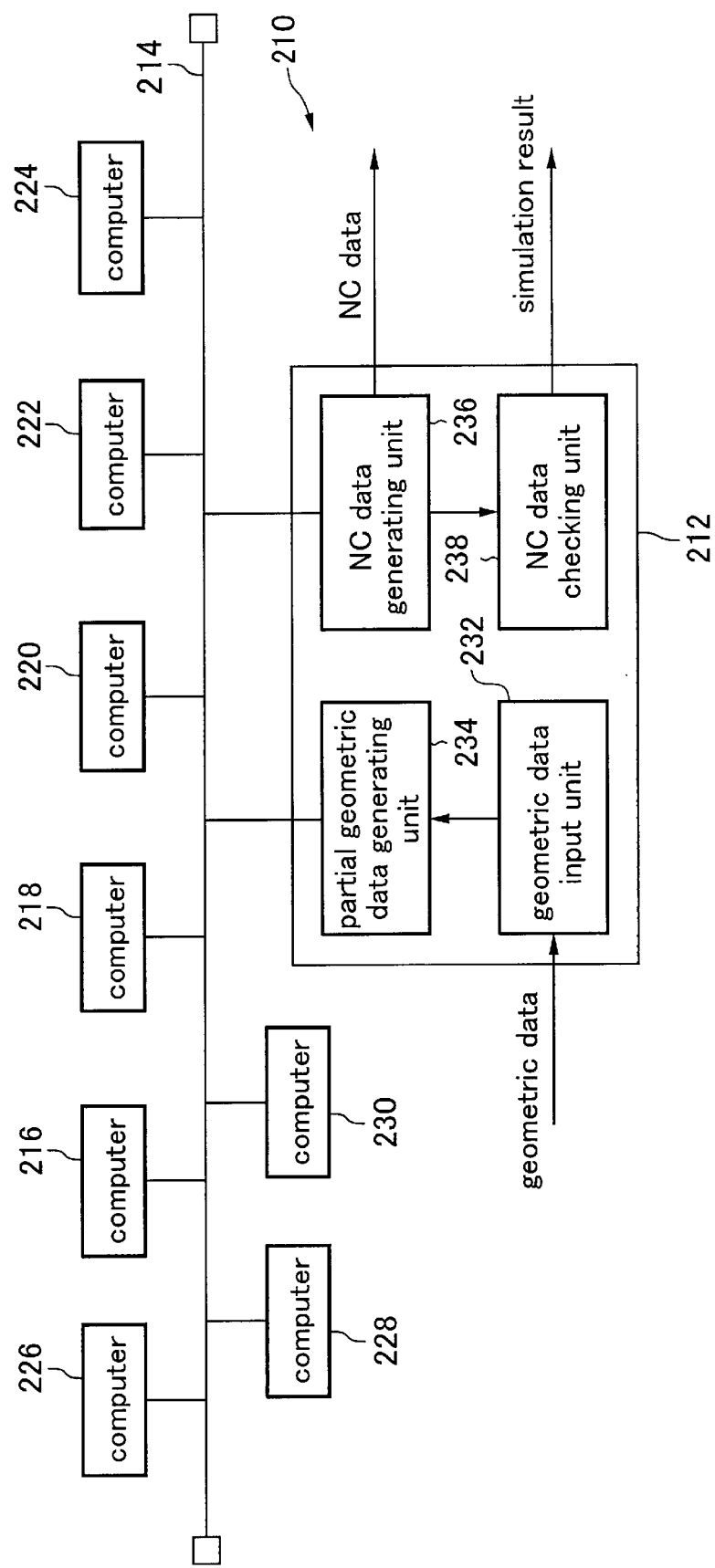
FIG. 8 is a schematic diagram showing a data generating device that is a second embodiment of the present invention.

As shown in FIG. 8, the data generating device 210 comprises a data generating unit 212 and eight computers 216, 218, 220, 222, 224, 226, 228 and 230 connected to the data generating unit 212 via a network 214. The data generating unit 212 and each of the computers 216–230 are constituted as, for example, a workstation, a personal computer and or the like. As the net work 214, there can be utilized a suitable communication network, such as a local area network or the Internet.

The data generating unit 212 includes a geometric data input unit 232 (geometric data input means), a partial geometric data generating unit 234 (partial geometric data generating means), an NC data generating unit 236 (partial numerical control data generating means and numerical data unifying means) and an NC data checking unit 238.

The geometric data input unit 232 is adapted to receive a set of geometric data representing the shape of the article to be machined input from the outside the device. Specifically, a set of geometric data for the article generated by a CAD (Computer Aided Design) system or the like is input to the geometric data input unit 232 using a recording medium such as flexible disc or suitable means such as the network 214. As the geometric data are used, for example, solid data directly defining the three-dimensional shape of the article to be machined.

The geometric data input unit 232 is adapted to modify the input data. This modification includes compensation for deficiencies that may occur in the geometric data generated in the CAD system and the input to the data generating device 210.

The geometric data input unit 232 is adapted to compare the input set of geometric data for the article to be machined at every part thereof with stored data on available tools, such as data on the dimension, shape, L/D (ratio of effective length to diameter) and to select a cutting tool suitable for machining each part of the article to be machined. For a rough cutting process in which a work is roughly machined, for instance, a cutting tool with a larger cutting amount, such as a flat end mill with a large diameter, is selected, and for a finish cutting process including the machining of a rounded surface or a narrow groove, a cutting tool capable of fine cutting, such as a ball end mill, is selected. Accordingly, when the machining of the article includes a rough cutting process and a finish cutting process, two sets of NC data, i.e., a set of NC data for the rough cutting process and a set of NC data for the finish cutting process, are generated from the geometric data of the article to be machined.

The geometric data input unit 232 is also adapted to output information regarding the selected tool (depth of cut and diameter of cutting tool) and geometric data to the partial geometric data generating unit 234.

The partial geometric data generating unit 234 is adapted to divide the input set of geometric data and to generate a plurality of sets of partial geometric data representing a plurality of divided parts constituting the article to be machined. Specifically, the partial geometric data generating unit 234 of this embodiment is adapted to divide the input geometric data into eight sets of partial geometric data each of which represents one of eight layers (parts of the article) of equal thickness. Further, the partial geometric data generating unit 234 is adapted to send eight sets of the partial geometric data to the eight computers 216–230 via the network 14 together with information regarding the cutting tool selected by the geometric data generating unit 232.

There are cases in which the cutting operation consists of a rough cutting process and a finish cutting process and some area is not machined in the finish cutting process. In such a case, NC data for the area that is not machined in the finish cutting process is not needed. When generating the NC data for the finish cutting process in such a case, this embodiment divides only the set of geometric data representing the area on which the finish cutting process is performed into eight sets and sends one of them to each of the eight computers 216–230 via network 214.

Each of the computers 216–230 is adapted to generate a set of NC data (set of partial numerically controlled data) for controlling the cutting tool so as to machine the corresponding layer (part of the article to be machined) based on the received set of partial geometric data. Each set of NC data includes data for the path of the cutting tool (NC path), translation speed of the cutting tool and rotation speed of the cutting tool. The most suitable cutting conditions, e.g., translation speed of the cutting tool and rotation speed of the cutting tool, are selected taking the kind of material of the workpiece, the kind of cutting tool and the shape of the cutting into account.

Each of the computers 216–230 is adapted to send the generated set of NC data to the NC data generating unit 236.

Each of the computers 216–230 is adapted to fractionate the received set of partial geometric data into smaller sets of partial geometric data representing thinner layers that the cutting tool can machine by one cutting operation. Further, each of computers 216–230 is adapted to generate smaller sets of NC data from received partial geometric data independently from and in parallel with the other computers, in a known manner.

The NC data generating unit 236 is adapted to generate a set of NC data for controlling the operation of the cutting tool to machine the whole of the article to be machined by unifying the sets of NC data for of the respective parts generated in the computers 216–230. In this unifying process, NC data for moving the cutting tool in the cutting depth direction by one step (that is by cutting depth d) are inserted between the sets of NC data representing neighboring layers (parts of the article). The NC data generating unit 236 is adapted to output the thus-generated NC data to the NC data checking unit 238.

The NC data checking unit 238 is adapted to simulate the operation of the cutting tool using the set of NC data and to show the result of the simulation on a display (not shown). By referring to the simulation result, therefore, the user can ascertain the shape of the article to be machined, the machining time and whether a dangerous operation of the cutting tool with occur. The user can modify the NC data if the simulated article does not have the desired shape, the machining time is extremely long and/or the cutting tool is apt to operate dangerously.

The NC data generating unit 236 is adapted to output the generated set of NC data in response to an instruction from the user upon accepting the simulation result, or automatically if the result of the simulation performed by the NC data checking unit 32 satisfies predetermined conditions. Such output of the set of NC data may be executed by creating an NC data file or by sending the data directly to the NC machine.

Figure 9:
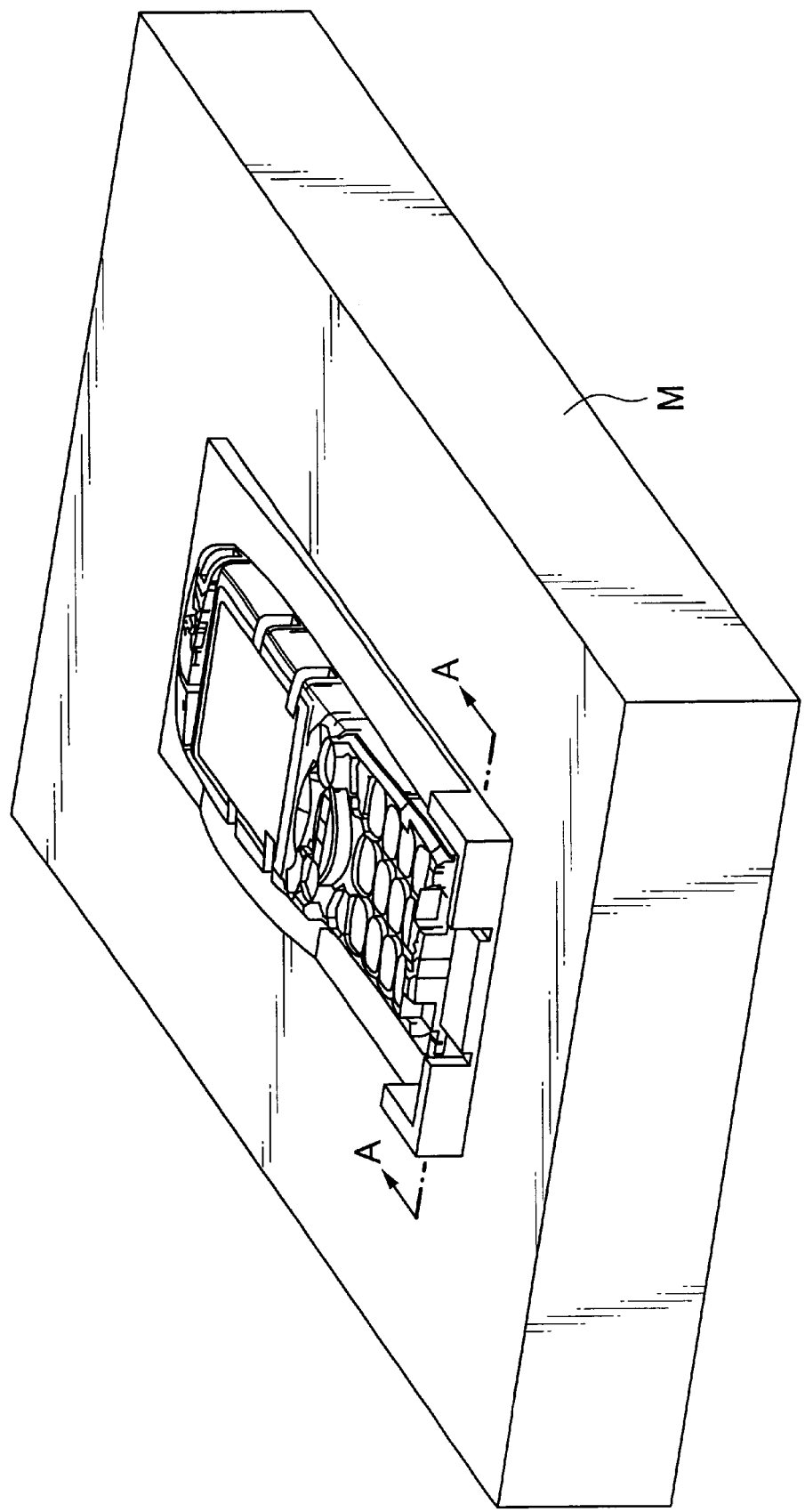
FIG. 9 is a perspective view showing an article to be machined whose data is generated by the data generating device according to the second embodiment of the invention.
Figure 10:
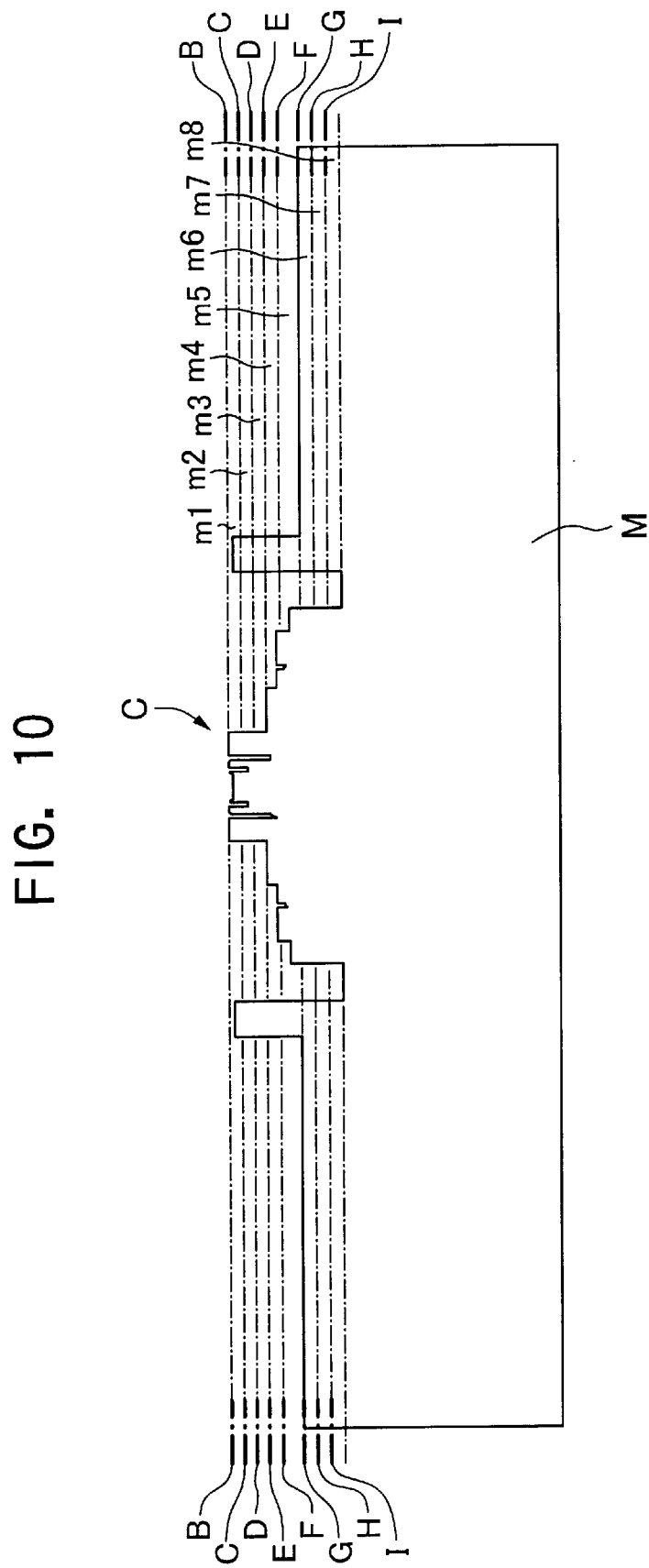
FIG. 10 is a cross-sectional view taken along line A—A in FIG. 9.

The operation of the data generating device 210 of the present embodiment will now be explained with reference to an example in which the data generating device 210 generates a set of NC data for machining a mold M for injection molding of a mobile phone body. FIG. 9 is a perspective view of the mold M and FIG. 10 is a cross-sectional view taken along A—A line in FIG. 9. FIGS. 10 through 18 show cross-sectional views taken along B—B line, C—C line D—D line, E—E line, F—F line, G—G line H—H line and I—I line in a FIG. 10, respectively.

As shown in FIGS. 9 and 10, the mold M, which is the article to be machined, has a protruding portion partially forming a cavity C for injection molding at the center of a rectangular parallelepiped metallic workpiece.

A set of geometric data representing the shape of the mold M is input to the geometric data input unit 232 in the data generating device 210 using a recording medium such as a flexible disc or other suitable means such as the network 214. This set of geometric data consists of design data generated in a CAD system based on the shape of the mobile phone body that will be produced by the mold M. In the present embodiment, solid data directly defining the three-dimensional shape of the mold M are used as the set of geometric data.

The geometric data input unit 232 modifies the input set of geometric data. Then a plurality of cutting tools required for machining the mold M is selected and sets of NC data for each of selected cutting tools are generated. Information regarding the selected tools (depth of cut and diameter of cutting tool) is output to the partial geometric data generating unit 234 together with the set of geometric data input to the geometric data input unit 232.

Then, based on the data input from the geometric data input unit 232, the partial geometric data generating unit 234 generates a plurality of sets of partial geometric data representing a plurality of parts constituting the article to be machined. More specifically, when a set of geometric data for rough cutting operation is generated, the geometric data representing the whole of area to be machined is divided into eight sets of geometric data each representing one of eight layers formed by dividing the mold M equally along the horizontal plane (X-Y plane). That is, the portion of the mold M which forms the cavity (upper portion) is divided into eight layers (parts) m1–m8 of a thickness of 2 mm and sets of partial geometric data representing the eight layers are generated.

Figure 17:
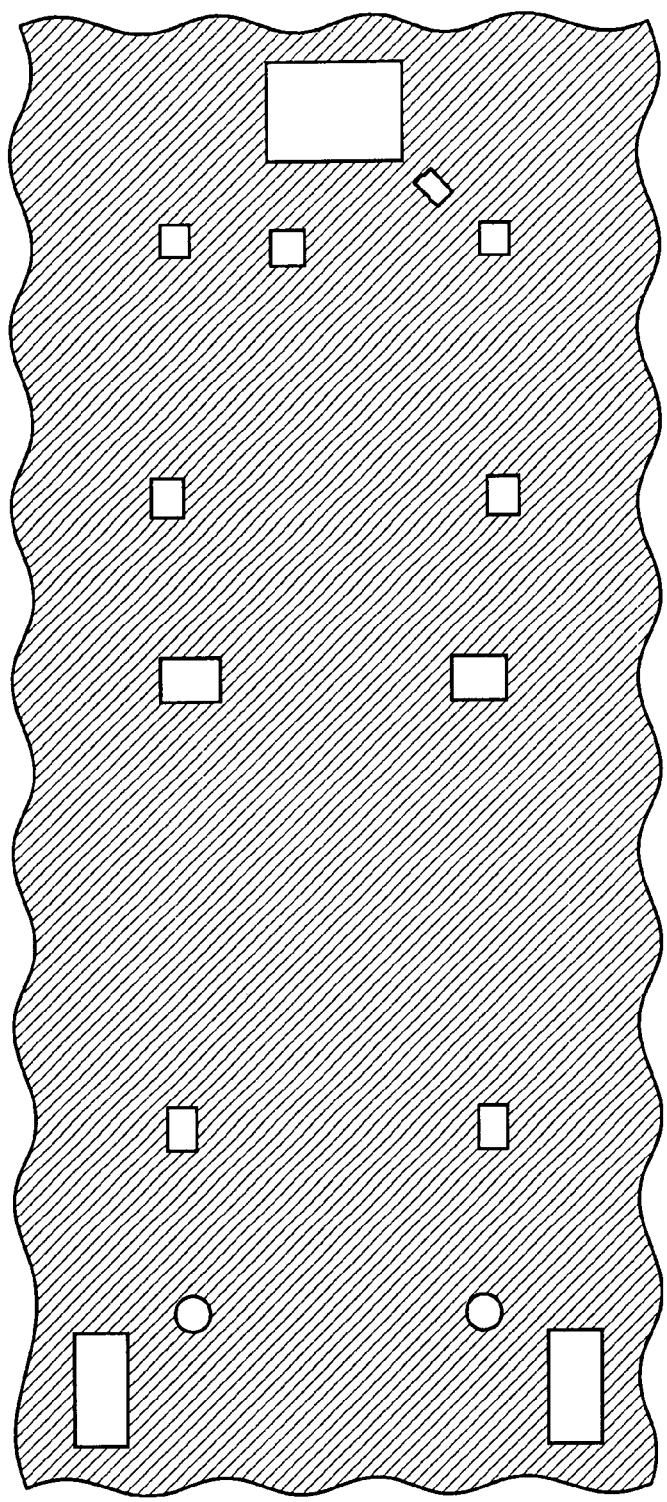
FIG. 17 is a cross-sectional view taken along line H—H in FIG. 10.
Figure 18:
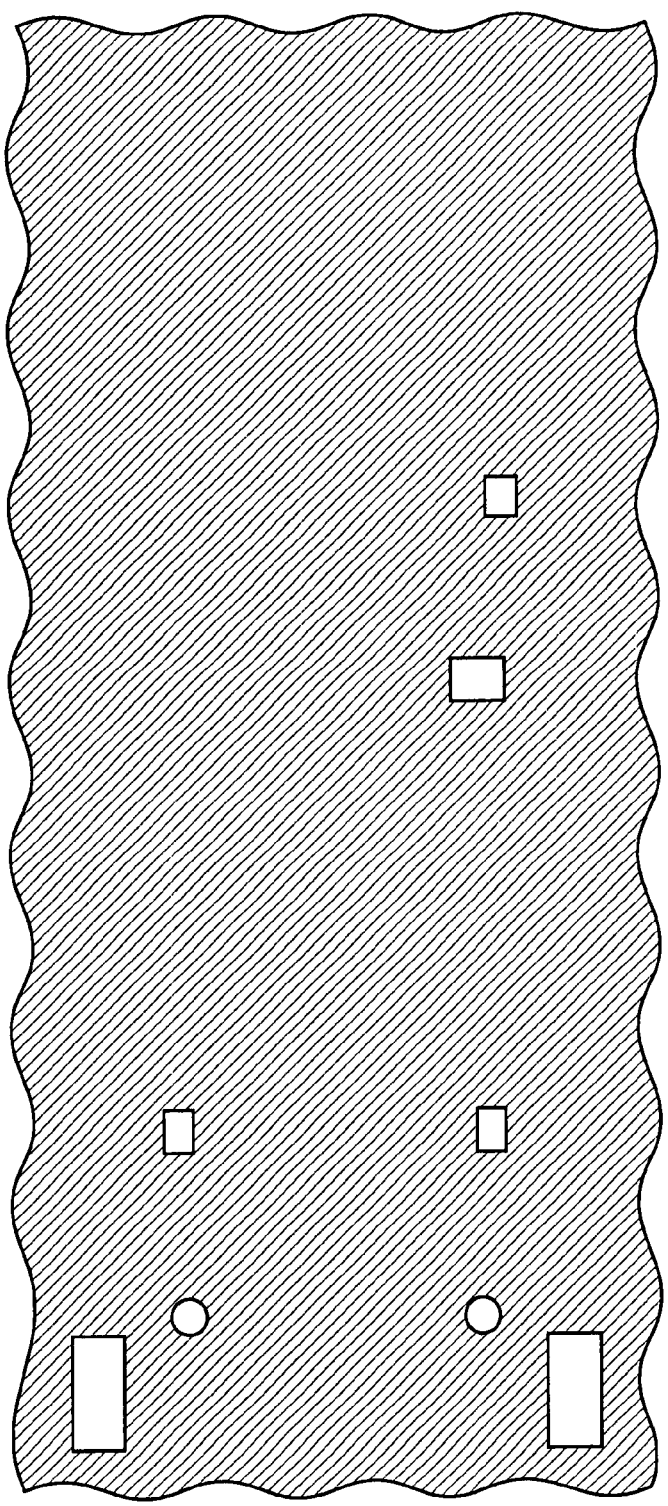
FIG. 18 is a cross-sectional view taken along line I—I in FIG. 10.

As shown in FIGS. 17 and 18, only rectangular recesses for cores are formed in the layers m7 and m8 of the mold M. Since such recesses are machined in the rough cutting process, no cutting is performed in the layers m7 and m8 during the fine cutting process. Thus, there are no NC data of the layers m7 and m8 for the finish cutting process. Therefore, when the NC data for the finish cutting process are generated, geometric data representing a portion composed of layers m1–m6 having a thickness of 12 mm are divided into eight layers and eight sets of geometric data representing the eight layers are generated.

The sets of the partial geometric data representing the eight layers m1–m8 are sent to the eight computers 216–230 via the network 214 together with information regarding the cutting tool selected by the geometric data generating unit 232. Specifically, the set of partial geometric data representing layer m1 is sent to the computer 216. The set of partial geometric data representing layer m2 is sent to the computer 218. The set of partial geometric data representing layer m3 is sent to the computer 220. The partial geometric data representing layer m4 is sent to the computer 222. The partial geometric data representing layer m5 is sent to the computer 224. The partial geometric data representing layer m6 is sent to the computer 226. The partial geometric data representing layer m7 is sent to the computer 228. The partial geometric data representing layer m8 is sent to the computer 230.

Each of the eight computers 216–230 generates a set of NC data for controlling the cutting tool so as to machine one of the layers m1–m8 (parts) based on the set of partial geometric data representing the corresponding one of the layers m1–m8 and information on the selected cutting tool. In this process, at first, each computer divides the received each set of partial geometric data representing the corresponding layer m1–m8 into smaller sets of partial geometric data representing thin layers (smaller parts) that the cutting tool can machine in one cutting operation. The thin layers (smaller parts) have equal thickness. The lower limit of the thickness of each thin layer (slice pitch) is the lower limit of the machining thickness in one cutting operation by the cutting tool. In this embodiment, it is 1 micrometer. Accordingly, in this embodiment, one set of partial geometric data for rough cutting operation can be divided into sets of smaller geometric data representing 2,000 layers. The thickness of the thin layer is determined taking the cutting depth of the cutting tool and the shape of the portion to be machined into account.

Since NC path is generated taking the diameter of the cutting tool to be used into account, the distance between adjacent NC paths is larger in the NC data for the rough cutting process in which a larger diameter tool is used. On the other hand, in the NC data for the finish cutting process in which smaller diameter tool is used, the distance between adjacent NC paths is smaller.

Then, NC data for machining each thin layer (smaller part) is generated based on the thus-generated smaller geometric data and the sets of NC data for machining the thin layers are unified to generate NC data for machining the layers (parts) m1–m8 is generated. In this unifying operation, NC data for moving the cutting tool in a cutting depth direction by one step (by the cutting depth of one cutting operation) are inserted between adjacent sets of NC data for machining the thin layers. This NC data includes data for the path of the cutting tool, translation speed of the cutting tool and rotation speed of the cutting tool.

The sets of NC data for each layer m1–m8 thus generated are sent the NC data generating unit 236 in the data generating device 212.

Figure 14:
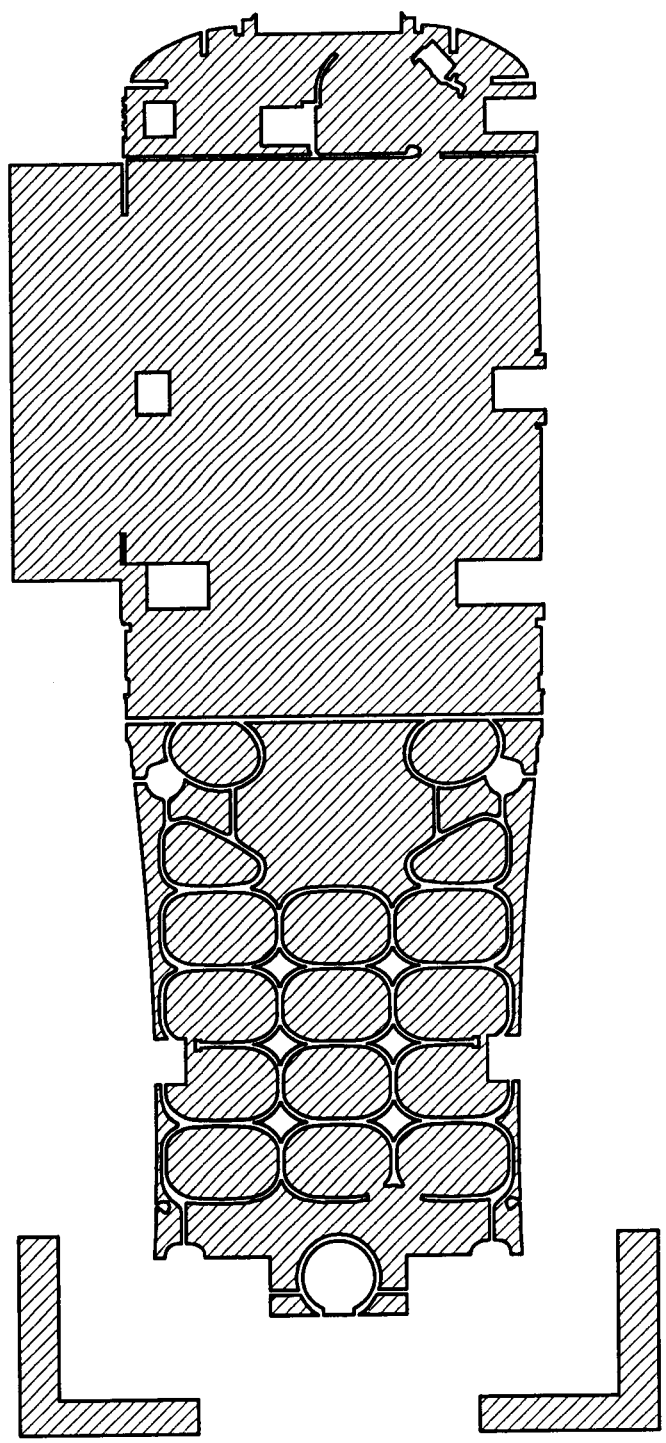
FIG. 14 is a cross-sectional view taken along line E—E in FIG. 10.
Figure 15:
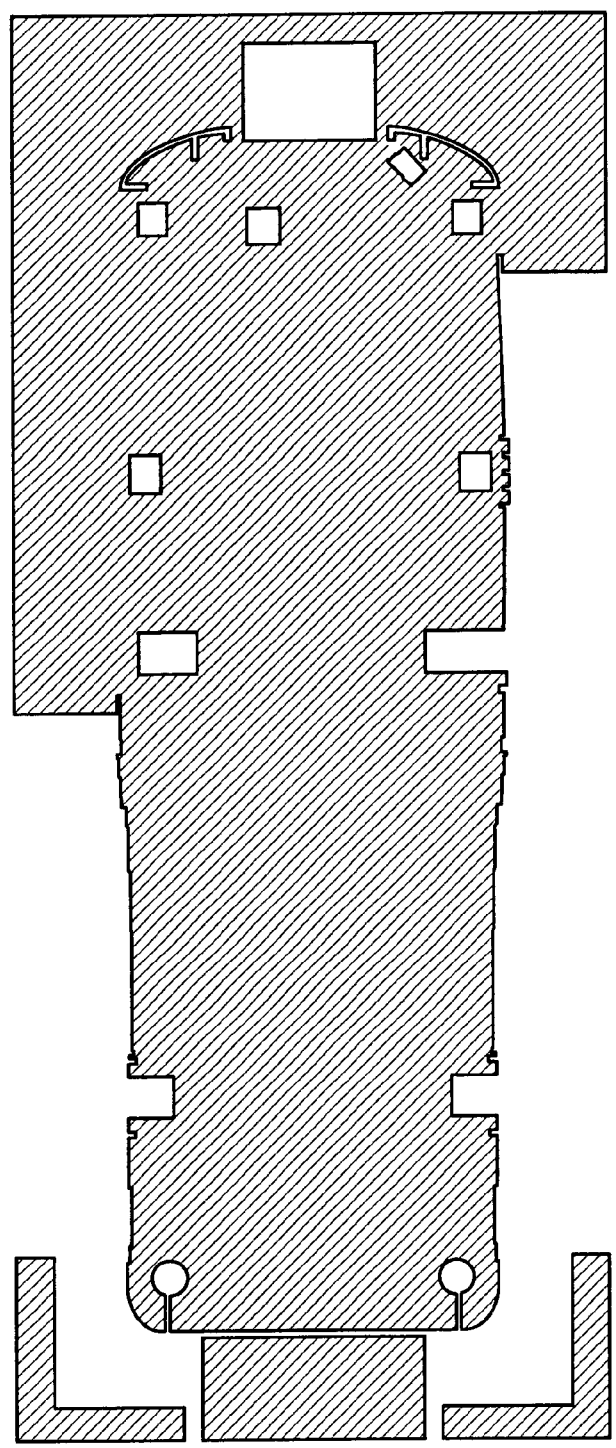
FIG. 15 is a cross-sectional view taken along line F—F in FIG. 10.
Figure 16:
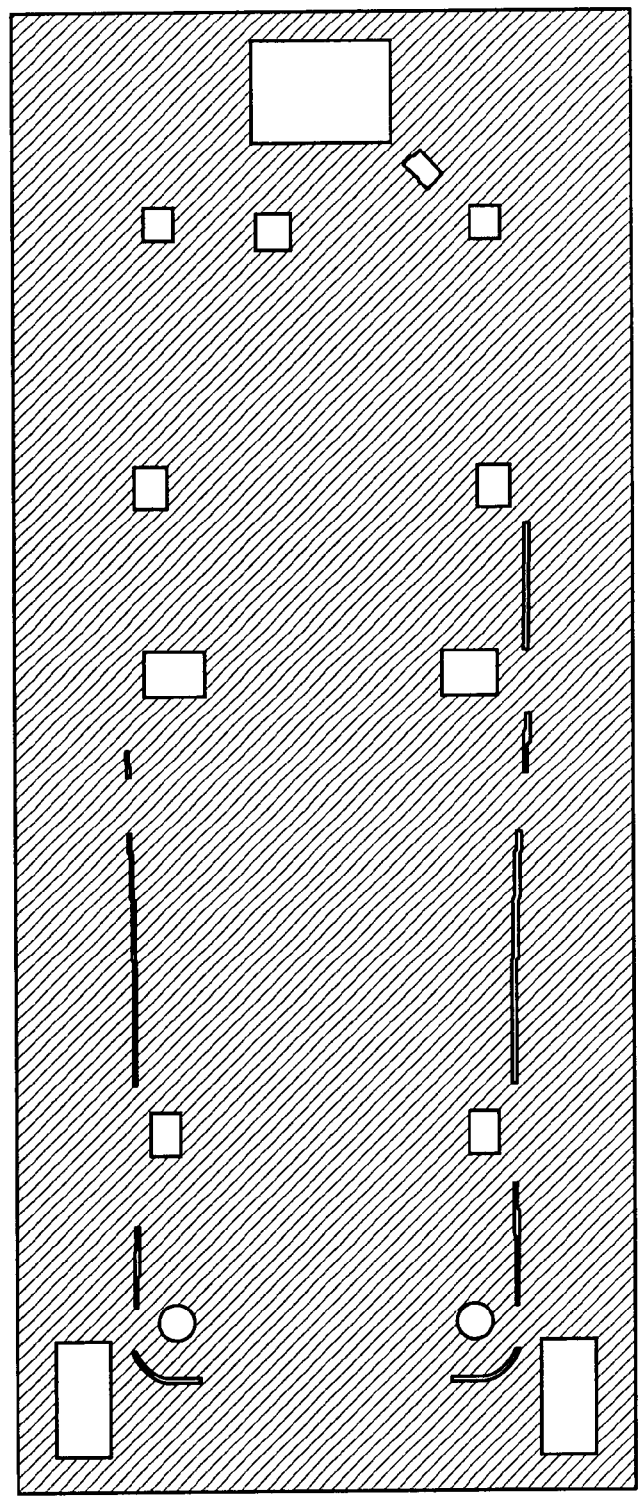
FIG. 16 is a cross-sectional view taken along line G—G in FIG. 10.
Figure 19:
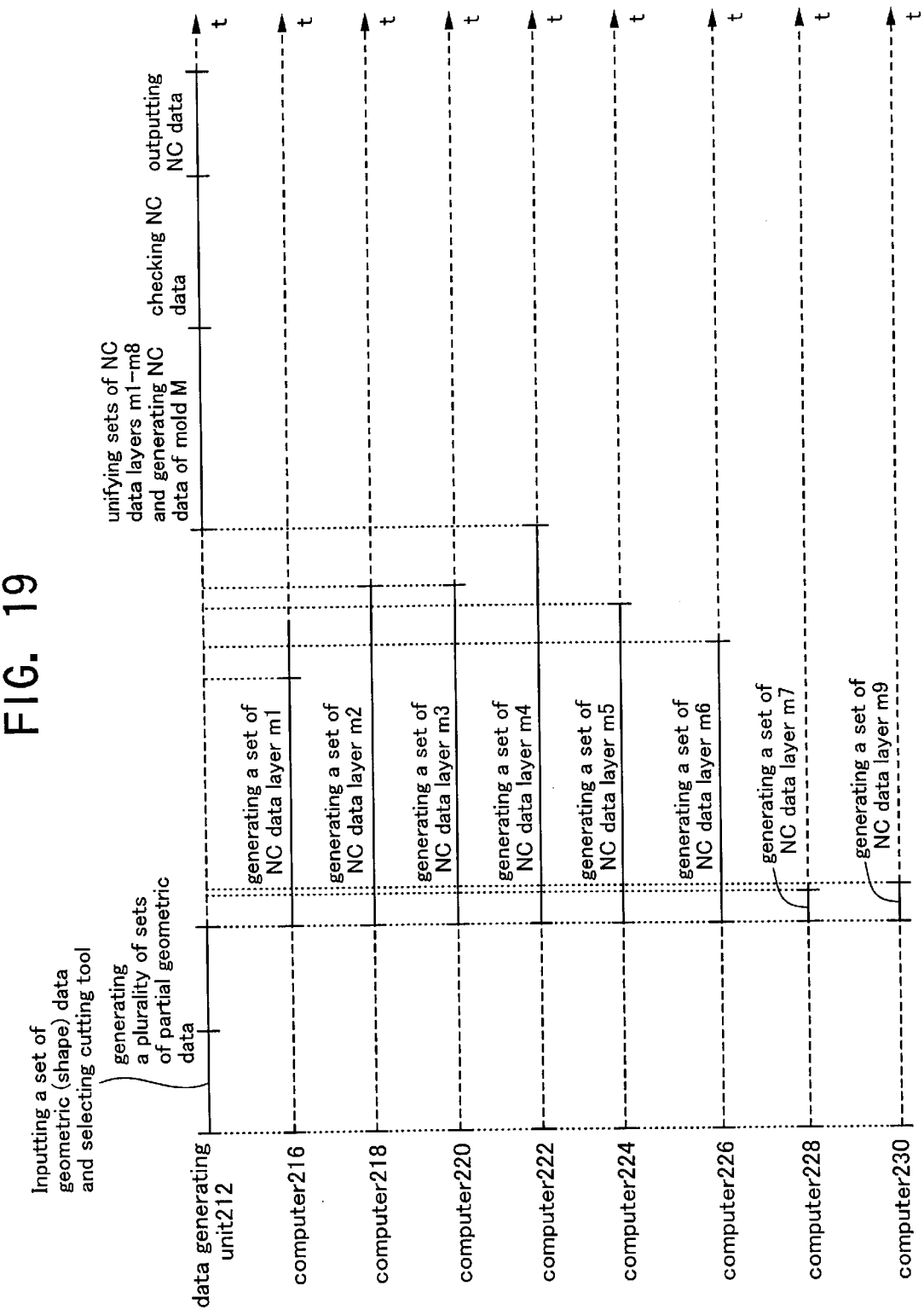
FIG. 19 is a time chart for showing an operation of the data generating device according to the second embodiment of the present invention.

As mentioned above, FIGS. 11 through 18 are horizontal cross-sectional views of the mold M showing cross-sectional views taken along B—B line, C—C line D—D line, E—E line, F—F line, G—G line H—H line and I—I line in a FIG. 10, respectively. Therefore, they show the shapes of the top surfaces of layers m1–m8. In these drawings, shaded portions show land portions in the mold M, that is, metal portions, for which finish cutting has been completed. As shown in these drawings, the layer m4, whose top surface is shown in FIG. 14, has more complex shape than the other layers. Therefore, the amount of geometric data for the layer m4 is larger than that of other layers. The time for generating the NC data for the finish cutting of the layer m4 is longer than the time for generating the NC data for the finish cutting of the other layers. As shown in FIG. 19, which is a time chart schematically representing this situation, data output from the computer 222 that generates the set of NC data for layer m4 sent to the NC data generating unit 236 falls behind the output from the other computers. FIG. 19 is schematic representation for use in explanation and therefore does not accurately show the relationship between the shapes of the individual layers m1–m8 and the time period for processing in the respective computers. Each of the computers 216–230 performs the above-described processing independently from and in parallel with the processing in the other computers. The computers 216–230 generate NC data from the partial geometric data in a known manner.

The NC data generating unit 236 unifies the sets of NC data for the layers m1–m8 (parts) sent from the computers 216–230 so as to generate NC data for controlling the operation of the cutting tool to machine the whole of the mold M. This unifying process begins when all sets of the NC data for the eight layers m1–m8 forming the mold M are received. In the unifying process, the sets of NC data for the eight layers generated in the computers 216–230 are arranged in order. In this process, NC data for moving the cutting tool in the cutting depth direction by one step (by the cutting depth in one cutting operation) are inserted between the sets of NC data for machining neighboring layers. Then, the NC data generated in the NC data generating unit 236 are output to the NC data checking unit 238.

The NC data checking unit 238 simulates the operation of the cutting tool using the NC data generated by the NC data generating unit 236 and shows the result of the simulation on a display (not shown). By referring to the simulation result, therefore, the user of the data generating device 12 can ascertain the shape of the article to be machined, the machining time and whether a dangerous operation of the cutting tool will occur. The user can modify the NC data if he finds that the simulated article does not have the desired shape, the machining time is extremely long and/or the cutting tool is apt to operate dangerously.

When the simulation by the NC data checking unit 32 is finished, the NC data is output in response to an instruction from the user of the data generating device 12 upon acceptance of the simulation result, or automatically if the result of the simulation performed by the NC data checking unit 32 satisfies predetermined conditions. Such output of the NC data may be performed by creating an NC data file or by sending the data directly to the NC machine.

Although in the above described embodiment the eight layers m1–m8 have the same thickness, the thickness of the layers can be varied depending on the amount of data required for machining the shapes of the layers. Since a long time is required to generate the NC data for the layer m3 whose amount of geometric data is large, the thickness of this layer can be made thinner when dividing the geometric data of the mold so as to include the same or nearly the same amount of data as in the other parts (layers). By this configuration, the amount of the data is equalized and the unification of the sets of NC data can be promptly started.

Further, in the present embodiment, the number of computers does not need to match the number of the partial geometric data sets.

In this embodiment, the generation of the NC data for the whole of the mold M may be started using the sets of partial data already sent before all sets of the NC data representing the layers constituting the mold M are received.

Although in the data generating device 10 of the above-described embodiment, solid data directly defining the three-dimensional shape of article 1 to be machined is used as the geometric data, surface data defining the shape of the article as a collection of surface shapes may be used instead.

The number of sets of partial geometric data and the number of computers are not limited to five or eight. For example, the geometric data of the article can be divided into ten sets of partial geometric data and ten computers be used to generating the NC data for machining the ten parts. Or the geometric data of the article can be divided into a hundred sets of partial geometric data and a hundred computers be used to generate the NC data for machining the hundred parts.

In data generating device of the above-described embodiment, the parts of the article to be machined are formed by dividing the article into layers extending along a direction perpendicular to the cutting depth. Instead, however, plural parts of the article can be formed by dividing the article into layers extending along the direction of the cutting depth. The shape of the parts into which the article to be machined is divided in not limited to layer shape but can be any various shapes. For instance, the article to be machined can be divided into parts of rectangular parallelepiped shape. Further, when article is divided into a plurality of parts, these parts may overlap at adjacent portions. By overlapping adjacent portions, it is possible to prevent occurrence of cutting deficiency caused by deformation of the cutting tool.

What is claimed is:

1. A data generating device for generating numerical control data for controlling the operation of a cutting tool when machining an article, comprising:

geometric data input means to which a set of geometric data representing a shape of said article to be machined is input;

partial geometric data generating means for dividing the set of geometric data into a plurality of sets of partial geometric data each representing one of a plurality of article parts constituting said article to be machined;

a plurality of partial numerical control data generating means for generating from said sets of partial geometric data sets of partial numerical control data for machining article parts represented by the partial geometric data; and numerical data unifying means for generating a set of numerical control data for machining the whole of said article to be machined by unifying the plurality of sets of said partial numerical control data;

wherein said plurality of partial numerical control data generating means generate at least two sets of partial numerical control data in parallel.

2. A data generating device for generating numerical control data for controlling the operation of a cutting tool when machining an article, comprising:

geometric data input means to which a set of geometric data representing a shape of said article to be machined is input;

partial geometric data generating means for dividing the set of geometric data into a plurality of sets of partial geometric data each representing one of a plurality of article parts constituting said article to be machined;

a plurality of partial numerical control data generating means for generating from said sets of partial geometric data sets of partial numerical control data for machining article parts represented by the partial geometric data; and numerical data unifying means for generating a set of numerical control data for machining the whole of said article to be machined by unifying the plurality of sets of said partial numerical control data;

wherein each of said article parts to be machined is formed as a layer extending in a direction perpendicular to a cutting depth direction of said cutting tool.

3. A data generating device according to claim 2, wherein all of said layers have the same thickness.

4. A data generating device according to claim 2, wherein the thickness of said layer is A times said cutting depth of the cutting tool, where A is an integer.

5. A data generating device according to claim 2, wherein the thickness of the layer is different depending on the amount of the data for said layer.

6. A data generating device according to claim 5,
wherein the thickness of a layer having a larger amount of said partial geometric data is set thinner than the thickness of a layer having a smaller amount of said partial geometric data.

7. A data generating device for generating numerical control data for controlling the operation of a cutting tool when machining an article, comprising:
geometric data input means to which a set of geometric data representing a shape of said article to be machined is input;
partial geometric data generating means for dividing the set of geometric data into a plurality of sets of partial geometric data each representing one of a plurality of article parts constituting said article to be machined;
a plurality of partial numerical control data generating means for generating from said sets of partial geometric data sets of partial numerical control data for machining article parts represented by the partial geometric data; and
numerical data unifying means for generating a set of numerical control data for machining the whole of said article to be machined by unifying the plurality of sets of said partial numerical control data;
wherein said partial numerical control data generating means comprises a plurality of computers.

8. A data generating device according to claim 7,
wherein some of said computers are connected via network.

9. A data generating device according to claim 1,
further comprising NC data checking means for simulating the operation of said cutting tool based on the numerical control data generated by said numerical data unifying means.

10. A data generating device according to claim 1,
further comprising data fractionating means for fractionating said sets of partial geometric data into smaller sets of geometric data representing smaller parts that can be machined in one cutting operation by said cutting tool.

11. A data generating device according to claim 1,
wherein said set of geometric data is solid data.

12. A data generating method for generating numerical control data for controlling the operation of a cutting tool when machining an article to be machined, comprising steps of:
inputting a set of geometric data representing a shape of said article to be machined;
dividing said set of geometric data to generate a plurality of sets of partial geometric data each representing one of a plurality of article parts constituting said article to be machined;
generating from said sets of partial geometric data sets of partial numerical control data for machining article parts represented by the partial geometric data; and
unifying the plurality of sets of said partial numerical control data to generate a set of numerical control data for machining the whole of said article to be machined;
wherein said step of generating sets of partial numerical control data includes a step of generating at least two sets of partial numerical control data in parallel.

13. A data generating method for generating numerical control data for controlling the operation of a cutting tool when machining an article to be machined, comprising steps of:
inputting a set of geometric data representing a shape of said article to be machined;
dividing said set of geometric data to generate a plurality of sets of partial geometric data each representing one of a plurality of article parts constituting said article to be machined;
generating from said sets of partial geometric data sets of partial numerical control data for machining article parts represented by the partial geometric data; and
unifying the plurality of sets of said partial numerical control data to generate a set of numerical control data for machining the whole of said article to be machined;
wherein said article part is set smaller in a portion where the amount of said partial geometric data is large than in a portion where the amount of said partial geometric data is small.

14. A data generating method according to claim 12,
further comprising a step of NC data checking for simulating the operation of said cutting tool based on the numerical control data generated by said numerical data unifying means.

15. A data generating method according to claim 12,
further comprising a step of fractionating for fractionating said sets of partial geometric data into smaller sets of geometric data representing smaller parts that can be machined in one cutting operation by said cutting tool.

16. A data generating program representing instructions executable by a computer comprising:
instructions for inputting a set of geometric data representing a shape of an article to be machined;
instructions for dividing said set of geometric data to generate a plurality of sets of partial geometric data each representing one of a plurality of article parts constituting said article to be machined;
instructions for generating from said sets of partial geometric data sets of partial numerical control data for machining article parts represented by the partial geometric data; and
instructions for unifying the plurality of sets of said partial numerical control data to generate a set of numerical control data for machining the whole of said article to be machined;
wherein, in said instruction for partial numerical control data, said article part is set smaller in a portion where the amount of said partial geometric data is large than in a portion where the amount of said partial geometric data is smaller.

17. A data generating device according to claim 2,
further comprising NC data checking means for simulating the operation of said cutting tool based on the numerical control data generated by said numerical data unifying means.

18. A data generating device according to claim 2,
further comprising data fractionating means for fractionating said sets of partial geometric data into smaller sets of geometric data representing smaller parts that can be machined in one cutting operation by said cutting tool.

19. A data generating device according to claim 2,
wherein said set of geometric data is solid data.

20. A data generating device according to claim 7, further comprising NC data checking means for simulating the operation of said cutting tool based on the numerical control data generated by said numerical data unifying means.

21. A data generating device according to claim 7, further comprising data fractionating means for fractionating said sets of partial geometric data into smaller sets of geometric data representing smaller parts that can be machined in one cutting operation by said cutting tool.

22. A data generating device according to claim 7, wherein said set of geometric data is solid data.

23. A data generating method according to claim 12, further comprising a step of NC data checking for simulating the operation of said cutting tool based on the numerical control data generated by said numerical data unifying means.

24. A data generating method according to claim 12, further comprising a step of fractionating for fractionating said sets of partial geometric data into smaller sets of geometric data representing smaller parts that can be machined in one cutting operation by said cutting tool.

* * * * *